No. 770,049. PATENTED SEPT. 13, 1904.
A. DORGANS.
INTERCHANGEABLE COUPLING.
APPLICATION FILED MAR. 20, 1903.
NO MODEL.
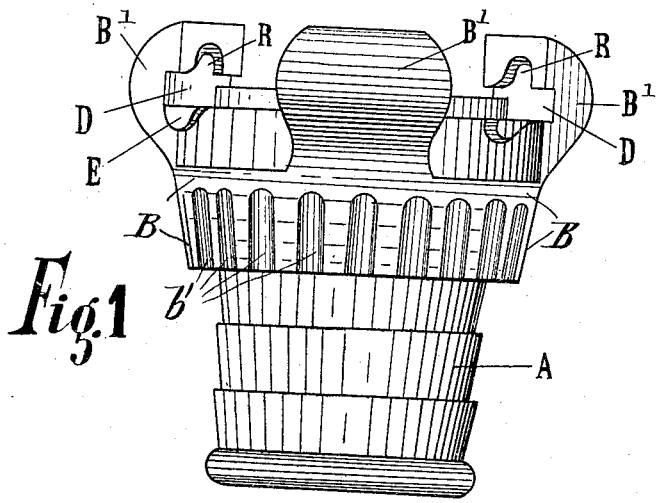
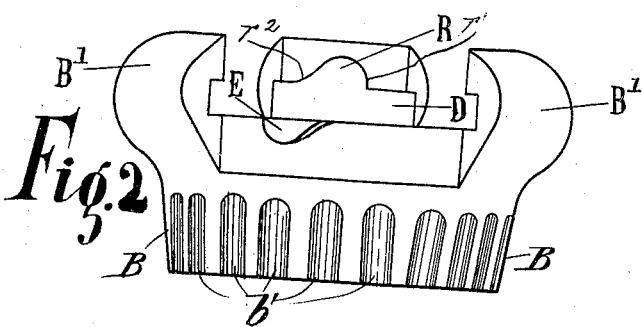
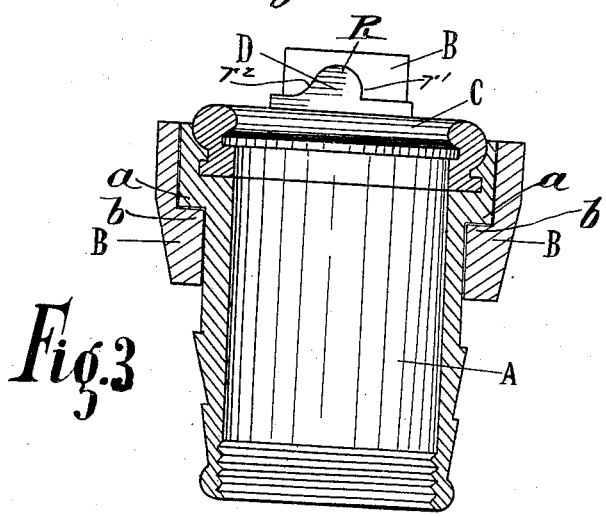
WITNESSES:
Henry J. Suhrbier
John J. Siale
INVENTOR
Auguste Dorgans
BY Goenex Niles
ATTORNEYS.

No. 770,049.

Patented September 13, 1904.

UNITED STATES PATENT OFFICE.

AUGUSTE DORGANS, OF BORDEAUX, FRANCE.

INTERCHANGEABLE COUPLING.

SPECIFICATION forming part of Letters Patent No. 770,049, dated September 13, 1904.

Application filed March 20, 1903. Serial No. 148,663. (No model.)

*To all whom it may concern:*

Be it known that I, AUGUSTE DORGANS, a citizen of the Republic of France, residing in Bordeaux, France, have invented certain new and useful Improvements in Interchangeable Couplings, of which the following is a specification.

This invention relates to interchangeable couplings of that class in which the two coupling members are identical, thus forming a hermaphrodite joint.

The invention has for its object to provide a joint in which the members clamp effectively when joined and one which is simple to manufacture and easily applied to pipe or hose ends.

For this purpose the invention consists of an interchangeable coupling, of which the novel features and combinations of parts will be fully described in the following specification and recited in the appended claim.

In the accompanying drawings, Figure 1 is an elevation of one member of my improved coupling ready to be applied to a pipe or hose end. Fig. 2 is an elevation of the movable sleeve, showing the same moved sixty degrees from the position shown in Fig. 1; and Fig. 3 is a central section of the position shown in Fig. 2.

Similar letters of reference indicate corresponding parts.

Referring to the drawings, A represents a shank one end of which is provided with projections or roughened sides, so as to be adapted to be securely fastened to a pipe or hose end, while the other end is provided with an inwardly-extending shoulder $a$, in which is seated an india-rubber ring C. To each shank A is applied a coupling member consisting of a sleeve B, which is provided with an inwardly-extending shoulder $b$, adapted to abut against the shoulder $a$ of the shank A. The sleeve B is also provided with outwardly-extending hook-shaped lugs B', provided at their inner sides with grooves D. Above and communicating with each of said grooves is a centrally-disposed recess R, which is substantially semicircular in shape. This recess forms a square shoulder $r'$ where it enters groove D at one side; but at the other side it tapers gradually into said groove, forming an inclined face $r^2$. The sleeve B is further provided with substantially circular lugs E, slightly beveled at one side, which correspond in number to the hook-shaped lugs B' and are adapted to slide in grooves D upwardly against the inclined faces $r^2$ and to seat themselves in the recesses R of the hook-shaped lugs. To facilitate the handling of the coupling members B, they are provided at their outer surface with grooves or recesses $b'$.

The two movable sleeves, of which one is applied to each shank which is attached to the hose or pipe end, are exactly alike, so that when brought face to face and the india-rubber ring compressed the lugs of one sleeve will engage with the corresponding grooves of the hook-shaped lugs of the other sleeve, and so effect a tight joint.

The operation of the coupling is as follows: The ends of the pipes are pushed together, and the sleeves B are turned in such a direction as to force the lugs E into contact with the inclined faces $r^2$ of grooves D and finally into engagement with the recesses or seats R. It will be seen that the shoulders $r'$ act as stops and, together with the expansive force of the rings C, secure the reliable intercoupling of the parts. To uncouple the joint, the sleeves are returned to their former position.

I claim as new and desire to secure by Letters Patent—

In a hose-coupling, the combination, with two shanks having resilient rings at the opposing ends thereof, of coupling members rotatable on said shanks, each member comprising a sleeve provided with spaced outwardly-extending hook-shaped lugs, each lug having an inner transverse groove and a substantially semicircular recess communicating with said groove and forming a shoulder at one side and an inclined face at the other side of the same, and beveled lugs corresponding in number to said hook-shaped lugs and in shape to the recesses in said lugs, and arranged between said hook-shaped lugs so as to engage the hook-shaped lugs on the opposing coupling member.

In testimony that I claim the foregoing as my invention I have signed my name in presence of two subscribing witnesses.

AUGUSTE DORGANS.

Witnesses:
   Louis Allen Sims,
   Justin Feigua.